(12) United States Patent
Ertas et al.

(10) Patent No.: US 10,577,975 B2
(45) Date of Patent: Mar. 3, 2020

(54) BEARING HAVING INTEGRALLY FORMED COMPONENTS

(71) Applicant: GENERAL ELECTRIC COMPANY, Schenectady, NY (US)

(72) Inventors: Bugra Han Ertas, Niskayuna, NY (US); Jason Joseph Bellardi, Cincinnati, OH (US); Joshua Tyler Mook, Loveland, OH (US)

(73) Assignee: General Electric Company, Schenectady, NY (US)

( * ) Notice: Subject to any disclaimer, the term of this patent is extended or adjusted under 35 U.S.C. 154(b) by 623 days.

(21) Appl. No.: 15/131,370

(22) Filed: Apr. 18, 2016

(65) Prior Publication Data
US 2017/0298773 A1    Oct. 19, 2017

(51) Int. Cl.
| F01D 25/22 | (2006.01) |
| F01D 25/16 | (2006.01) |
| F02C 7/06 | (2006.01) |
| F16C 32/06 | (2006.01) |
| F01D 5/02 | (2006.01) |
| F01D 11/00 | (2006.01) |
| F01D 9/04 | (2006.01) |

(52) U.S. Cl.
CPC .............. *F01D 25/22* (2013.01); *F01D 5/02* (2013.01); *F01D 11/001* (2013.01); *F01D 25/16* (2013.01); *F02C 7/06* (2013.01); *F16C 32/0607* (2013.01); *F16C 32/0614* (2013.01); *F01D 9/041* (2013.01); *F05D 2220/30* (2013.01); *F05D 2240/128* (2013.01); *F16C 2360/23* (2013.01); *Y02T 50/671* (2013.01)

(58) Field of Classification Search
CPC .... F01D 25/164; F01D 25/16; F16C 32/0614; F02C 7/06
See application file for complete search history.

(56) References Cited

U.S. PATENT DOCUMENTS

| 3,035,759 A | 5/1962 | Paulson et al. |
| 5,222,815 A | 6/1993 | Ide |
| 5,421,655 A | 5/1995 | Ide et al. |
| 5,603,574 A | 2/1997 | Ide et al. |
| 5,743,654 A | 4/1998 | Ide et al. |
| 6,700,747 B2 | 3/2004 | Matz |

(Continued)

FOREIGN PATENT DOCUMENTS

| CN | 101749322 A | 6/2010 |
| EP | 2187072 A1 | 5/2010 |

OTHER PUBLICATIONS

International Search Report and Written Opinion issued in connection with corresponding PCT Application No. PCT/US2017/027291 dated Jul. 20, 2017.

(Continued)

*Primary Examiner* — Justin D Seabe
*Assistant Examiner* — John S Hunter, Jr.
(74) *Attorney, Agent, or Firm* — Armstrong Teasdale LLP (57) ABSTRACT

Embodiments of a stage for a turbomachine have been provided herein. In some embodiments, a stage for a turbomachine may include a bearing having a housing, the bearing defining an interior cavity; an outer ring disposed radially outward from the housing; and a plurality of airfoils disposed between the housing of the bearing and the outer ring.

20 Claims, 10 Drawing Sheets

(56) References Cited

U.S. PATENT DOCUMENTS

| | | | |
|---|---|---|---|
| 8,083,413 | B2 | 12/2011 | Ertas |
| 8,113,799 | B2 | 2/2012 | Wu et al. |
| 8,366,382 | B1 * | 2/2013 | Muldoon ................ F01D 11/02 415/111 |
| 9,121,448 | B2 * | 9/2015 | Delgado Marquez ....................... F01D 25/166 |
| 9,169,846 | B2 | 10/2015 | Mariotti et al. |
| 2010/0278465 | A1 | 11/2010 | Klusman et al. |
| 2013/0216174 | A1 | 8/2013 | Braun |
| 2014/0125176 | A1 | 5/2014 | Swann |
| 2015/0104123 | A1 | 4/2015 | Ertas et al. |
| 2015/0104124 | A1 | 4/2015 | Delgado Marquez et al. |
| 2015/0275967 | A1 | 10/2015 | Ryu |

OTHER PUBLICATIONS

Bugra H Ertas, "Compliant Hybrid Journal Bearings Using Integral Wire Mesh Dampers", Journal of Engineering for Gas Turbines and Power, vol. 131, Issue 2, pp. 1-11, Mar. 2009.

* cited by examiner

BEARING HAVING INTEGRALLY FORMED COMPONENTS

BACKGROUND

The field of the disclosure relates generally to gas bearing assemblies, and more particularly, to gas bearings having integrally formed components.

Conventional turbomachines possess rotor assemblies that include shafts, compressor impellers, turbines, couplings, sealing packs and other elements required for optimal operation under given operating conditions. These rotor assemblies have a mass generating a constant static force due to gravity, and also generate a dynamic force due to imbalances in the rotor assembly during operation. Other static forces can be generated from geared turbomachinery. Such turbomachines include bearings to sustain and support these forces while permitting rotation of the rotor assembly.

At least some known rotary machines use gas bearings where a non-oil lubricated bearing is desired. However, the inventors have observed that some gas bearings, particularly gas bearings that have been adapted for use in full-scale turbomachinery, typically require a substantial number of assembled components to provide the necessary functionality to meet dynamic loading requirements. Such a high number of components introduce high complexity, cost, and weight to the gas bearing, thereby limiting potential applications especially in aerospace turbomachinery where weight reduction is paramount. Moreover, the high number of components increases a size of the gas bearing without providing additional functionality, thereby preventing the gas bearing form being utilized within space limited locations throughout the turbomachinery such as aircraft engines.

Therefore, the inventors have provided an improved gas bearing having integrally formed components.

BRIEF DESCRIPTION

Embodiments of a stage for a turbomachine have been provided herein. In some embodiments, a stage for a turbomachine may include a bearing having a housing, the bearing defining an interior cavity; an outer ring disposed radially outward from the housing; and a plurality of airfoils disposed between the housing of the bearing and the outer ring.

In some embodiments, a turbomachine may include a rotor assembly coupling a compressor section and a turbine section; a stage disposed about the rotor and rotationally supporting the rotor, the stator comprising: a bearing having a housing, the bearing defining an interior cavity; an outer ring disposed radially outward from the housing; and a plurality of airfoils disposed between the housing of the bearing and the outer ring.

In some embodiments, the plurality of airfoils may be a plurality of inlet guide vanes for, for example, a guide vane assembly. In some embodiments, the plurality of airfoils may be a plurality of nozzles for, for example, a nozzle ring.

The foregoing and other features of embodiments of the present invention will be further understood with reference to the drawings and detailed description.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of engine components (e.g., stators) having integrated bearings are provided herein. In at least some embodiments, such integration may advantageously allow for an overall reduction in parts and weight of the engine. Moreover, integrating the one or more bearings into other components allows for the bearing to be utilized in various locations throughout the engine that would otherwise not be feasible utilizing conventional bearing designs. Moreover, the integration of bearing and other components allows such utilization across various locations throughout the engine without significantly disrupting an existing cross section, length or architecture of the engine. In addition, in at least some embodiments, the inventive stator may further allow for a higher than conventional number of bearings to be utilized throughout the engine. Such use of additional bearings may allow for an increased force distribution across the axial length of the rotor system, which may result in less shaft deflection, thereby reducing rotor stresses (e.g., bending), reducing clearance closures at compressor and turbine stages and reducing or eliminating instances of contact between rotors, thus reducing or eliminating wear or damage caused by such instances.

Figure 1:
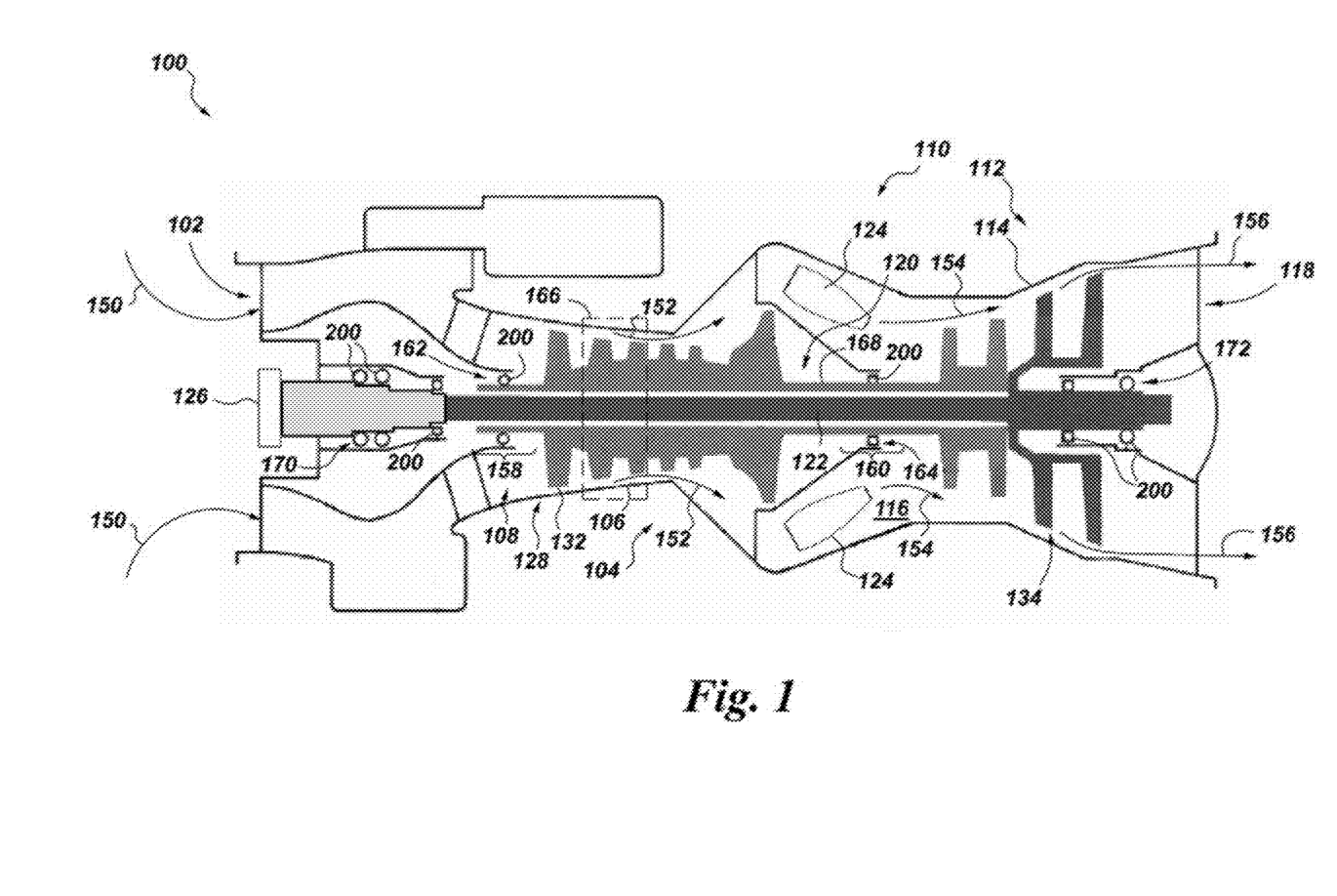
FIG. 1 is a schematic view of a rotary machine.

FIG. 1 is a schematic view of a rotary machine, i.e., a turbomachine 100, and more specifically, a non-oil lubricated turbine engine. In the exemplary embodiment, the turbine engine is a gas turbine engine. Alternatively, turbomachine 100 is any other turbine engine and/or turbomachine, including, without limitation, a steam turbine engine, a centrifugal compressor, and a turbocharger. In the exemplary embodiment, turbomachine 100 includes an air intake section 102, and a compressor section 104 that is coupled downstream from, and in flow communication with, intake section 102. Compressor section 104 is enclosed within a compressor casing 106 defining a compressor chamber 108. A combustor section 110 is coupled downstream from, and in flow communication with, compressor section 104, and a turbine section 112 is coupled downstream from, and in flow communication with, combustor section 110. Turbine section 112 is enclosed within a turbine casing 114 defining a turbine chamber 116. An exhaust section 118 is provided downstream from turbine section 112. Moreover, in the exemplary embodiment, turbine section 112 is coupled to compressor section 104 via a rotor assembly 120 including a drive shaft 122. Drive shaft 122 is rotationally supported by one or more bearing assemblies, for example, gas bearing or journal bearing assemblies (shown at multiple positions in accordance with one or more embodiments at 200) located within compressor casing 106 and turbine casing 114.

In the exemplary embodiment, combustor section 110 includes a plurality of combustor assemblies, i.e., combustors 124 that are each coupled in flow communication with compressor section 104. Moreover, in the exemplary embodiment, turbine section 112 and compressor section 104 are rotatably coupled to a load 126 via drive shaft 122. For example, load 126 may include, without limitation, an electrical generator and/or a mechanical drive application, e.g., a pump, a propeller, fan, rotor, or the like. In some embodiments, the turbomachine 100 may be an aircraft engine.

Also, in the exemplary embodiment, compressor section 104 includes at least one compressor blade assembly 128 and at least one optional adjacent stationary vane assembly (not shown). Each combination of compressor blade assembly 128 and adjacent stationary vane assembly defines a compressor stage. Also, each compressor blade assembly 128 includes a plurality of compressor blades 132 and each stationary vane assembly includes a plurality of compressor vanes. Furthermore, each compressor blade assembly 128 is removably coupled to drive shaft 122 and each stationary vane assembly is removably coupled to, and supported by, compressor casing 106.

Further, in the exemplary embodiment, turbine section 112 includes at least one turbine blade assembly 134 and at least one adjacent stationary nozzle assembly (not shown). Each combination of turbine blade assembly 134 and adjacent stationary nozzle assembly defines a turbine stage. Also, each turbine blade assembly 134 is removably coupled to drive shaft 122 and each stationary nozzle assembly is removably coupled to, and supported by, turbine casing 114.

In operation, air intake section 102 channels air 150 towards compressor section 104. Compressor section 104 compresses inlet air 150 to higher pressures and temperatures prior to discharging compressed air 152 towards combustor section 110. Compressed air 152 is channeled to a fuel nozzle assembly (not shown), mixed with fuel (not shown), and burned within each combustor 124 to generate combustion gases 154 that are channeled downstream towards turbine section 112. Combustion gases 154 generated within combustors 124 are channeled downstream towards turbine section 112. After impinging turbine blade assembly 134, thermal energy is converted to mechanical rotational energy that is used to drive rotor assembly 120. Turbine section 112 drives compressor section 104 and/or load 126 via drive shaft 122, and exhaust gases 156 are discharged through exhaust section 118 to ambient atmosphere. Bearing assemblies 200 facilitate rotation of rotor assembly 120 and dampen vibrational energy imparted to the rotor assembly 120 during operation of turbomachine 100. Although bearing assemblies 200 are described and illustrated as being located within compressor casing 106 and turbine casing 114, bearing assemblies 200 may be located at any desired location along shaft 122 including, but not limited to, a central or mid-span region of shaft 122, or other locations along shaft 122 where the use of conventional bearing assemblies would present significant design challenges. Further, bearing assemblies 200 may be used in combination with conventional oil-lubricated bearing assemblies. For example, in one embodiment, conventional oil-lubricated bearing assemblies may be located at the ends of shaft 122, and one or more bearing assemblies 200 may be located along a central or mid-span region of shaft 122.

Figure 2A:
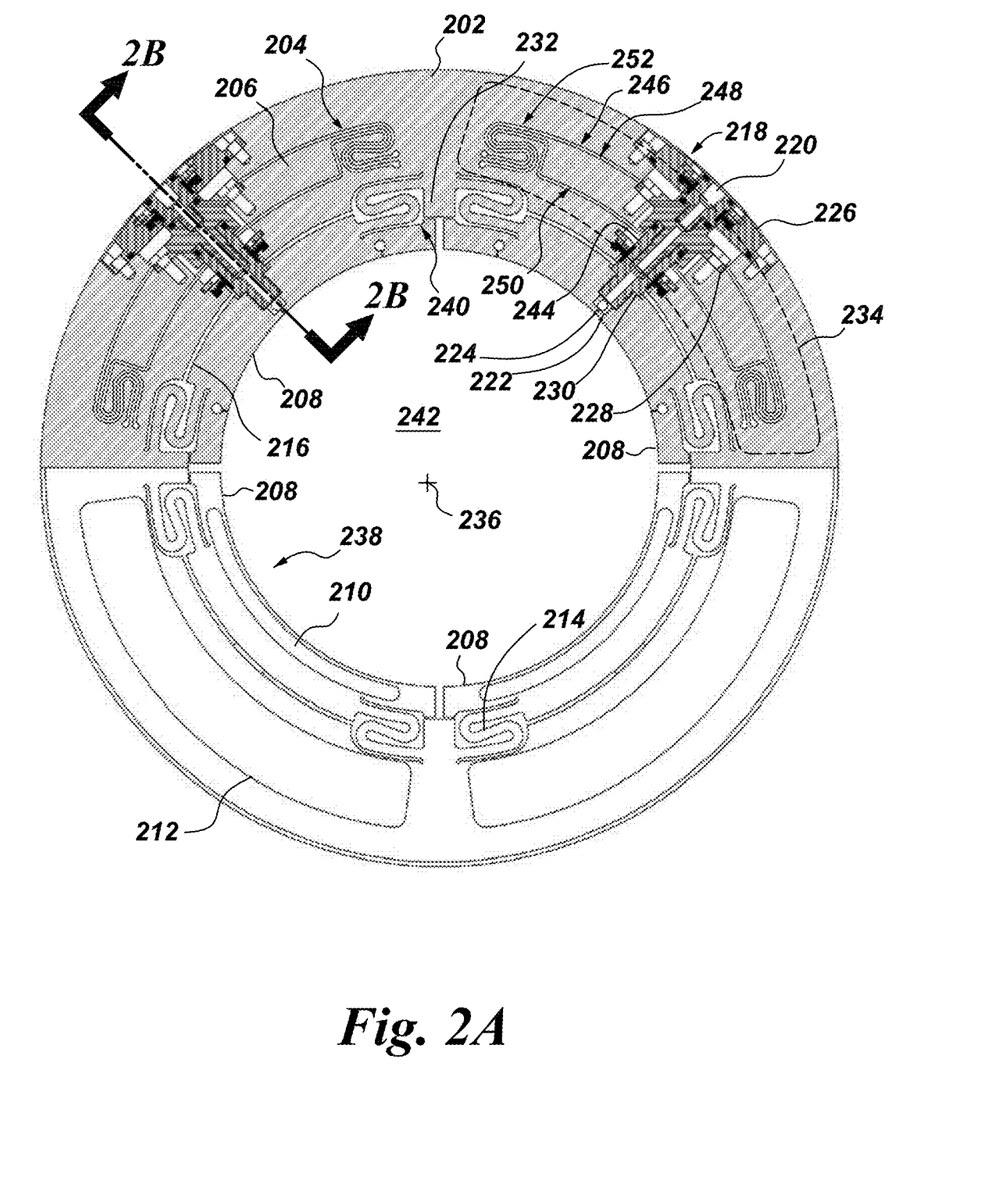
FIG. 2A is an axial and partial cross-sectional view of an exemplary gas bearing in accordance with some embodiments of the present invention.

Referring to FIG. 2A, in some embodiments, the bearing 200 may generally comprise an outer rim 202, housing 216, a plurality of bearing pads 208 and a plurality of damper assemblies (indicated generally at 234 of FIG. 2A).

The bearing pads 208 are symmetrically arranged about a central axis 236 of the bearing assembly 200 and define an annular inner surface 238 that is configured to support a rotatable shaft (e.g. shaft 122 of FIG. 1). In some embodiments, each bearing pad 208 is adapted to receive a working gas (e.g., air, compressed air, or the like) from a gas inlet 220, and disperse and/or diffuse the gas to support and/or lubricate the shaft during operation of the turbomachine, thereby providing a hydrostatically pressurized compliant bearing pad 208. For example, in some embodiments, each bearing pad 208 has a sufficiently high gas permeability to permit the gas received via the gas inlet 220 to generate sufficient pressure within interior cavity 242 to provide the support and/or lubrication of the shaft 122. Alternatively, or in combination, in some embodiments, the bearing pad 208 may include a plurality of gas distribution holes 224 disposed across the bearing pad 208 to provide an evenly distributed pressure field within an interior cavity 242 for supporting and/or lubricating the shaft. In such embodiments, the plurality of gas distribution holes 224 may be fluidly coupled to one or more plenums 222 to facilitate even distribution of the gas. In embodiments where the one or more plenums 222 are present, a bearing pad sealing plate 210 may be coupled to the bearing pad 208 to seal the one or more plenums 222.

The plurality of gas distribution holes 224 may be configured having any dimensions or arrangements (e.g., array, pattern or configuration) suitable to function as described herein. For example, in some embodiments, the plurality of gas distribution holes 224 may generally have a diameter in the range of between about 2 mils (about 50 micrometers) and about 100 mils (about 2,540 micrometers) and, more specifically, between about 5 mils (about 127 micrometers) and about 20 mils (about 508 micrometers).

The bearing pads 208 may be fabricated from any material suitable to withstand the working conditions of the bearing 200. In addition, in some embodiments, the bearing pad 208 is fabricated form a material having a sufficiently low porosity to prevent instabilities in the thin gas film created between bearing pads 208 and shaft during operation of the turbomachine. For example, in some embodiments, the bearing pads 208 may be fabricated from porous carbons, such as carbon graphite, sintered porous ceramics, and sintered porous metals, such as Inconel® and stainless steel.

The inventors have observed that conventional gas bearings typically include a bearing pad assembly to facilitate coupling the bearing pad to the gas bearing housing. However, such assemblies are typically constructed from a plurality of separate components that require assembly, thereby adding weight to the gas bearing and making the gas bearing complex and costly. As such, in some embodiments, the bearing pads 208 may be coupled to the housing 216 via a plurality of bearing pad springs (springs) 214. When present, the springs 214 facilitate coupling of the bearing pads 208 to the housing 216 while providing movement of bearing pads 208 in a radially inward or outward direction (in relation to the central axis 236) and/or a transfer of energy between the bearing pad 208 and a damper plunger 206 of the damper assemblies 234. In some embodiments, one or more mechanical stops 232 may be disposed proximate a back surface 240 of the bearing pads 208 to limit a range of motion of the bearing pad 208.

In some embodiments, each of the bearing pad springs 214 may be integrally formed with at least one of the bearing pads 208 and the housing 216. For example, in some embodiments, the bearing pads 208, bearing pad springs 214 and the housing 216 may be fabricated to form a single integral part, such as shown in FIG. 2A. In addition, in some embodiments, the housing 216 and outer rim 202 may similarly be fabricated to form a single integral part (e.g., such as shown in the figures). The inventors have observed that providing the separate components (e.g., bearing pads 208, bearing pad springs 214, housing 216, outer rim 202) as a single integral part reduces a total number of parts that would otherwise be utilized in conventional gas bearing construction, thereby reducing weight, complexity, cost and overall size of the bearing as compared to conventional gas bearings.

The bearing pads 208, bearing pad springs 214 and the housing 216 may be fabricated via any technique suitable to facilitate forming the integral part. For example, in some embodiments, the bearing pads 208, bearing pad springs 214 and the housing 216 may be fabricated using an electric discharge machining (EDM) process or additive manufacturing process (also known as rapid prototyping, rapid manufacturing, and 3D printing) such as selective laser sintering (SLS), direct metal laser sintering (DMLS), electron beam melting (EBM), diffusion bonding, or selective heat sintering (SHS).

Figure 2B:
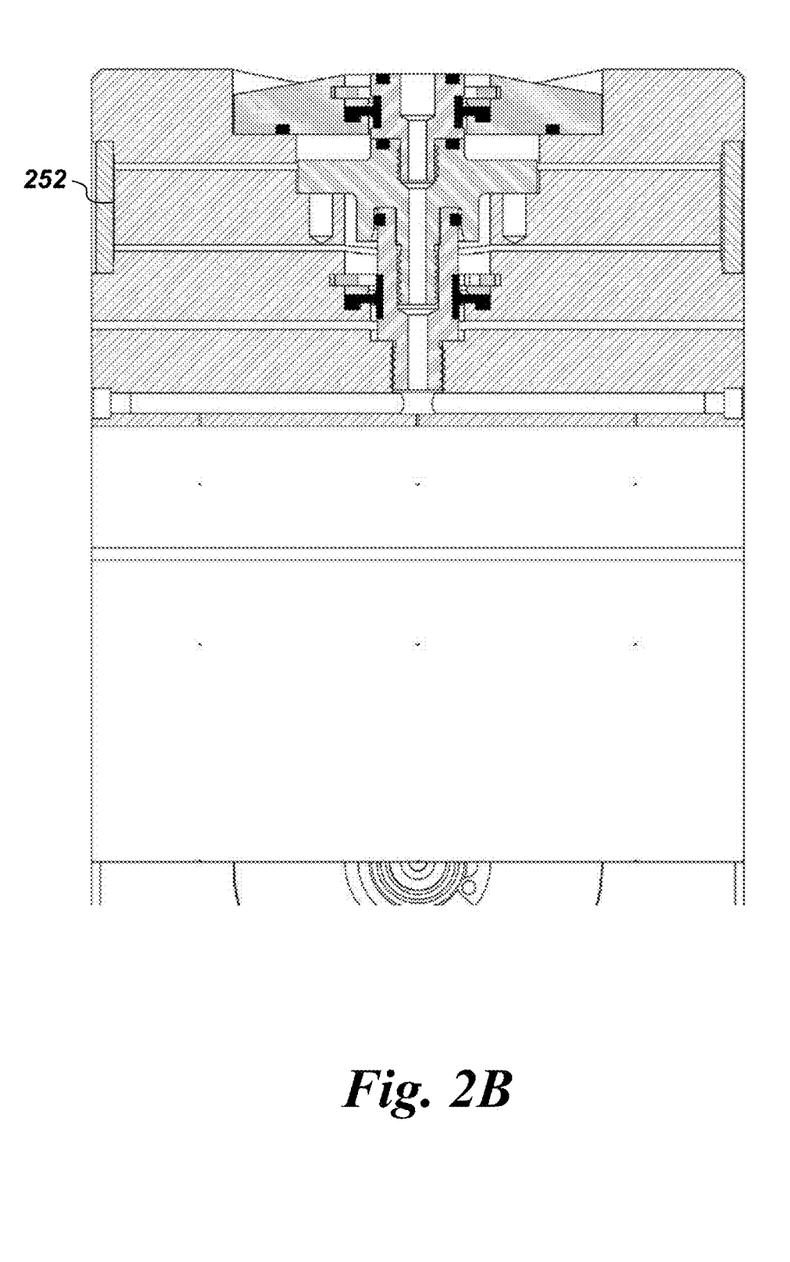
FIG. 2B is a cross-sectional view of the exemplary gas bearing along the line 2B-2B of FIG. 2A in accordance with some embodiments of the present invention.

The damper assemblies 234 generally comprise a damper plunger 206, damper spring 204, and a coupling assembly 218. The damper plunger 206 is disposed within a cavity 246 formed within the housing 216 and coupled to the housing 216 via the damper spring 204. The damper spring 204 supports the damper plunger 206 and separates the cavity 246 into a first control volume 248 and second control volume 250, forming a resistive path 252 (shown in FIGS. 2A and 2B) between the first control volume 248 and second control volume 250. The unoccupied portion of the cavity 246 is filled with a non-compressible, viscous fluid and is hermetically sealed via a sealing plate 212. The fluid may be any non-compressible, viscous fluid suitable for the particular operating environment. For example, in some embodiments, the fluid may be an oil-based fluid, a liquid metal (broadly, a metallic fluid), or the like.

The coupling assembly 218 generally includes a plurality of seals (three seals 226, 228, 230 shown), a plunger 244, and the gas inlet 220. The plunger 244 is configured to transmit loads imparted on a bearing pad 208 to the damper assembly 234. For example, in operation, when plunger 244 is loaded and unloaded (via a force applied to the bearing pad 208), the fluid is forced through resistive flow path 252 thereby converting vibrational energy imparted on damper assembly 234 into heat, which is subsequently dissipated through conduction and/or convention convection.

In some embodiments, the damping plunger 206 and damper spring 204 may be a single integrally formed part. In addition, in such embodiments, the damping plunger 206 and damper spring 204 may be further integrally formed with the housing 216, such as shown in FIG. 2A. Any suitable fabrication technique may be utilized to create such integrally formed parts, for example such as the EDM or additive manufacturing techniques described above. As discussed above, the inventors have observed that providing the separate components (e.g., damping plunger 206, damper spring 204, housing 216) as a single integral part reduces a total number of parts that would otherwise be utilized in conventional gas bearing construction, thereby reducing weight, complexity, cost and overall size of the bearing as compared to conventional gas bearings.

Figure 3:
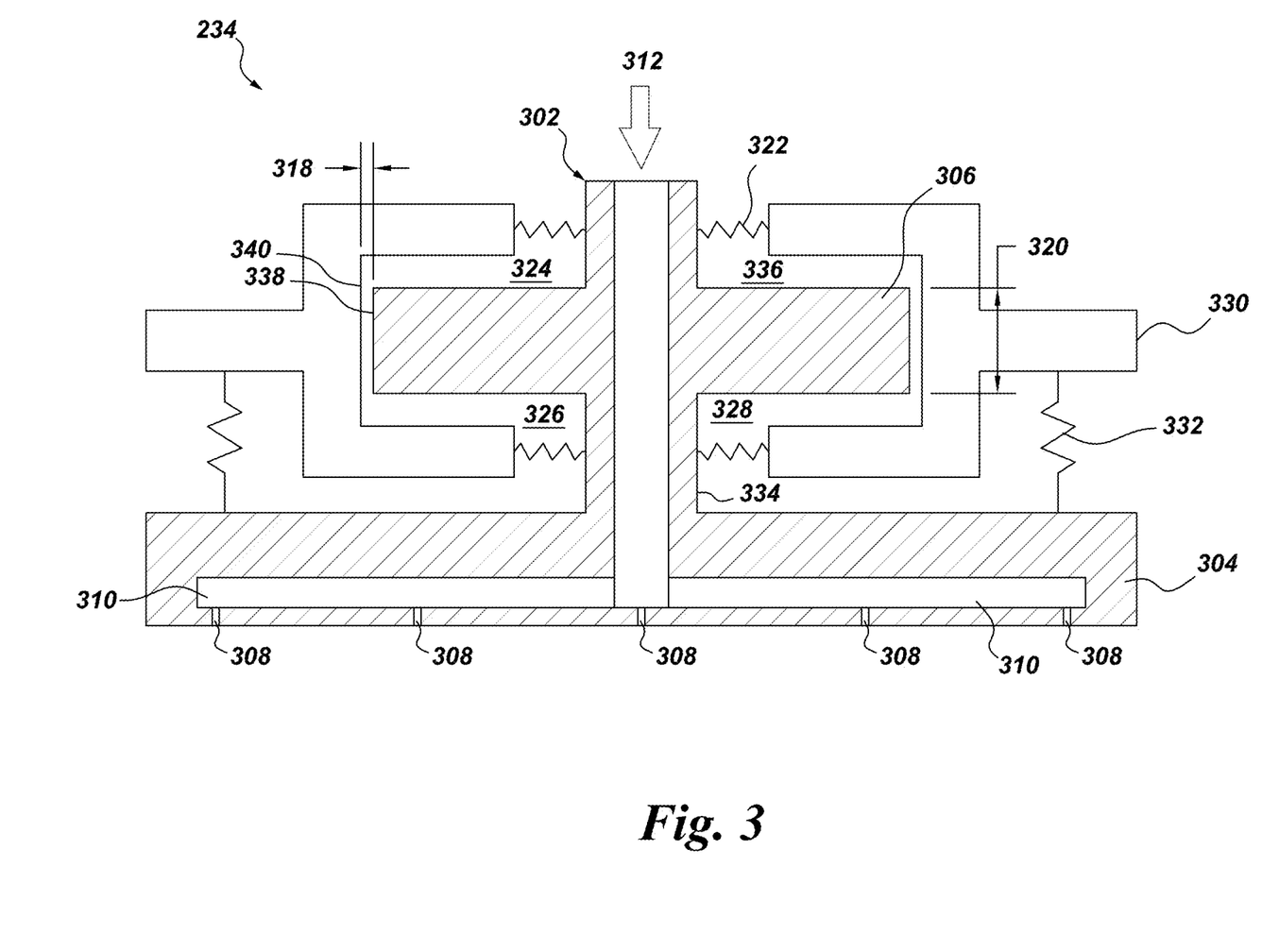
FIG. 3 is a schematic view of a damper assembly suitable for use with a gas bearing in accordance with some embodiments of the present invention.

Although shown as a multicomponent part in FIG. 2A, in some embodiments, the coupling assembly 218 may be replaced by a single part that is integrally formed with the bearing pad 208. For example, FIG. 3 depicts the damper plunger 306 and damper pad 304 as a single integrally formed component (collectively "integral damping pad 302"). Providing the damper plunger 306 and damper pad 304 as a single integrally formed component facilitates a further reduction in parts of the bearing 200, thereby further reducing the cost, complexity, size and weight of the bearing 200. Any suitable fabrication technique may be utilized to create such integrally formed parts, for example such as the EDM or additive manufacturing techniques described above.

Referring to FIG. 3, in some embodiments, the plunger 306 and damper pad 304 may be coupled to one another via a shaft 334, which is also an integral part of the integral damping pad 302. In some embodiments, one or more springs 332 may support the bearing pad 304, and further, may couple the bearing pad to a housing 330 (e.g., housing 216 of bearing 200 described above) and control a radial stiffness of the bearing.

In some embodiments, the shaft 334 extends beyond the damper plunger 306 and includes a through hole 314 formed therein to facilitate coupling a gas inlet 312 to a plenum 310 and gas distribution holes 308 of the bearing pad 304. When present, the gas inlet 312, plenum 310 and gas distribution holes 308 provide the same or similar functionally and may be configured the same or similar to the gas inlet 220, plenum 222 and gas distribution holes 224 described above.

The damper plunger 306 is disposed within a cavity 336 formed in the housing 330 and separates the cavity 336 into a first control volume 324 and a second control volume 326. The damper plunger 306 and cavity 336 is dimensioned relative to one another to provide a predetermined clearance 318 between an end 338 of the damper plunger 306 and the cavity wall 340 to form a resistive flow path 320 between the first control volume 324 and the second control volume 326. The unoccupied portion of the cavity 336 is filled with a non-compressible, viscous fluid 328 and is hermetically sealed via a compliant seal 322. It is to be noted, that in some embodiments, a stiffness of the compliant seal 322 and springs 332 may each be adjusted in relation to one another to control an overall stiffness of the bearing 200. For example, in some embodiments, the compliant seal 322 may be significantly less stiff than the springs 332 to allow a designer to control the bearing support stiffness predominately through the springs 332.

In operation, when a force (e.g., a vibrational force caused by rotation of a shaft) is applied to the bearing pad 304, a relative motion between the damper plunger 306 and the housing 330 occurs. Such a motion causes the fluid 328 to be forced through resistive flow path 320 between the first control volume 324 and the second control volume 326 of the cavity 336. Due to a dash-pot effect of the fluid 328 (resistance to motion via viscous friction) an energy of the force is dissipated, thereby damping the force.

Figure 4:
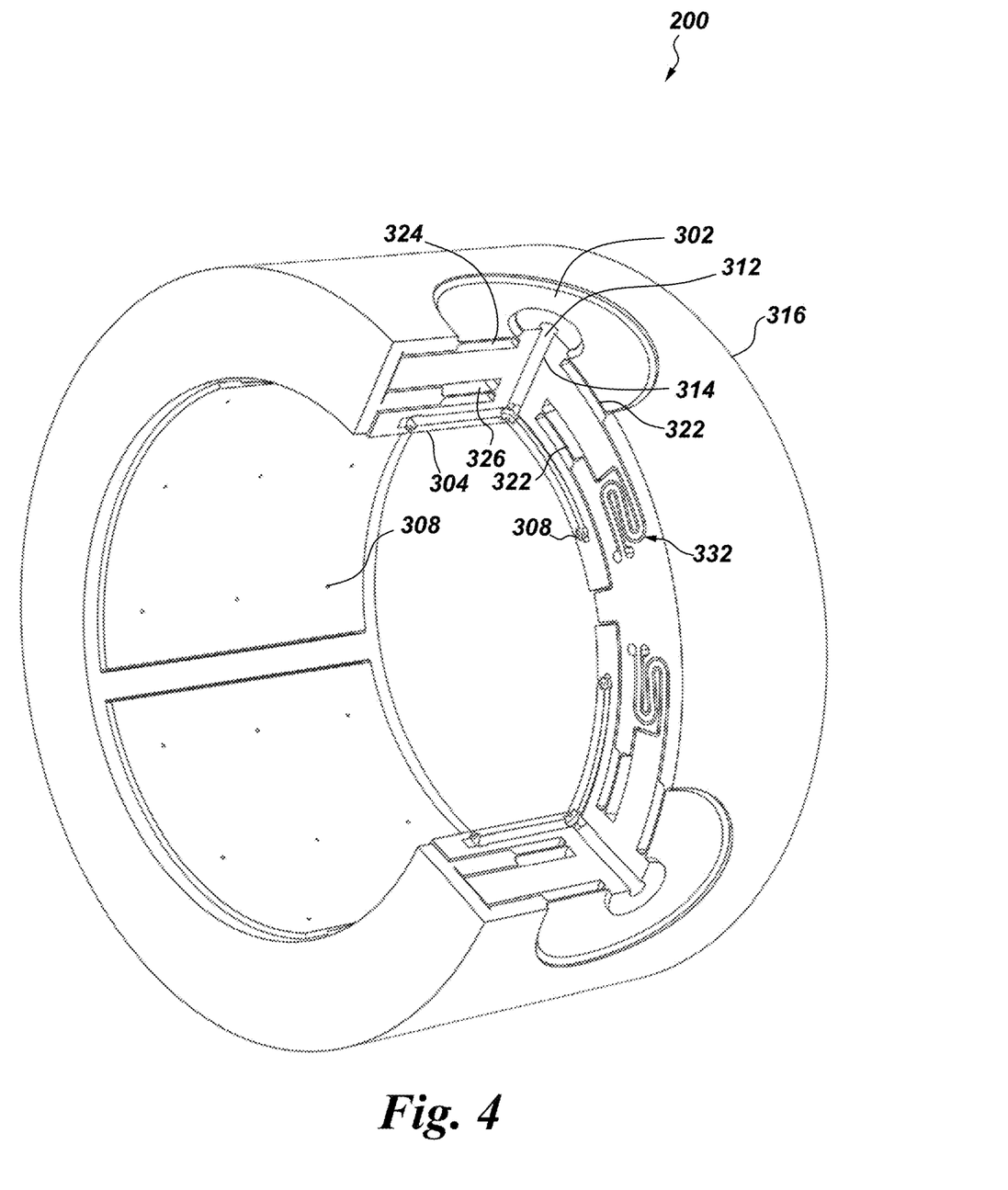
FIG. 4 is a partial cross-sectional view of an exemplary gas bearing in accordance with some embodiments of the present invention.

While described above as separate components, the compliant seal 322, housing 330, springs 332 and integral damping pad 302 may all be integrally formed to provide a single component, thereby further reducing the cost, complexity, size and weight of the bearing 200. Any suitable fabrication technique may be utilized to create such integrally formed parts, for example such as the EDM or additive manufacturing techniques described above. For example, an exemplary implementation of the integral damper pad 302 in a bearing 200 is shown in FIG. 4. In such embodiments, and as shown in the figure, the entire bearing 200 may be fabricated as a single part. The inventors have observed that fabricating the bearing 200 as a single part significantly reduces a weight and size of a conventionally assembled multicomponent bearing. Such a reduction in weight and size allows the bearing to be used in weight and space limited applications (e.g., aircraft engines) that would otherwise exclude the use of conventionally assembled multicomponent bearings.

Figure 5:
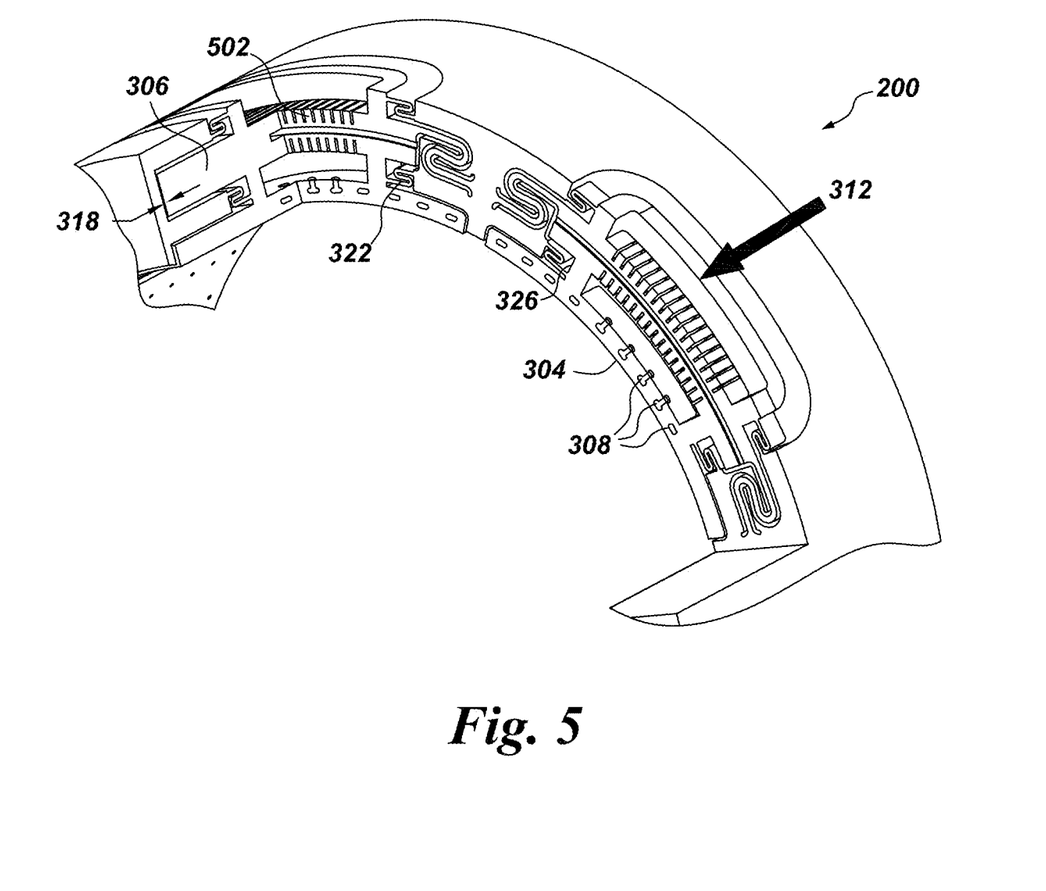
FIG. 5 is a partial cross-sectional view of an exemplary gas bearing in accordance with some embodiments of the present invention.

FIG. 5 depicts another exemplary implementation of the integrally fabricated bearing 200. As depicted in FIG. 5, in some embodiments, the damper plunger 306 may include a plurality of cooling fins (heat exchanger 502). In such an embodiment, pressurized air provided by the gas inlet 312 passes through the heat exchanger 502 prior to progressing through the bearing pad 304 to support and/or lubricate the shaft during operation of the turbomachine.

Conventional engines (e.g., the turbomachine 100 shown in FIG. 1) typically utilize oil requiring bearings, for example, such as angular contact ball bearings, cylindrical roller bearings, or the like. However, such oil bearings require a number of additional parts and complex systems that allow for the oil to be used within the engine, for example, separate bearing sumps, recirculation systems, filtering systems, or the like. Moreover, certain components of the engine (e.g., compressor or turbine blades, or the like) must be isolated from any oil utilized in the bearings to prevent damage to the components. Such isolation is typically attained via axial spans and spacing (collectively indicated at 158, 160) between the bearings and other engine components to define boundaries and prevent oil from interacting with the engine components. The inventors have observed that the aforementioned additional systems and axial span and spacing required to allow the use of the oil bearings contribute to the overall length and weight of the engine, thereby limiting the efficiency and versatility of the engine.

In addition, such requirements limit the possible locations and/or distribution of the bearings throughout the engine. For example, referring back to FIG. 1, conventional placement for oil requiring bearings, roller bearings, multi-part gas bearings, or the like, may be limited to certain positions along one or more shafts the engine to accommodate for the support systems and/or span requirements described above. For example, one or more of the bearings may be disposed proximate one end of a high pressure turbine (HPT) or core shaft 168 (bearing location shown at 164) and/or between the compressor section 104 and turbine section 112 to facilitate rotation of the shaft 168 (bearing location shown at 162). In addition, one or more of the bearings may be disposed proximate one or more ends of the drive shaft 122 (bearing locations shown at 170, 172) to facilitate rotation of the drive shaft 122.

Figure 9:
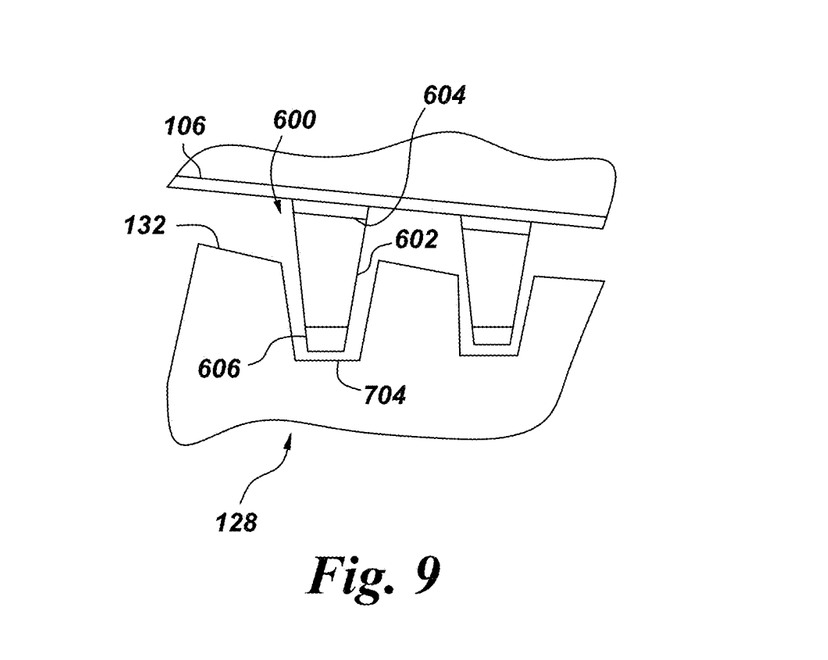
FIG. 9 is a partial view of a portion of a turbomachine and stage in accordance with some embodiments of the present invention.

As such, in some embodiments, one or more of the bearings may be integrated into one or more engine components that would otherwise be present in the engine. The inventors have observed that integrating one or more bearings into other components allows for an overall reduction in parts and weight of the engine. Moreover, integrating the one or more bearings into other components allows for the bearing to be utilized in various locations throughout the engine that would otherwise not be feasible utilizing conventional bearing designs (e.g., as described below with respect to FIGS. 9-11). In addition, the integration of bearing and other components allows such utilization various locations throughout the engine without disrupting an existing cross section, length or architecture of the engine.

Figure 6:
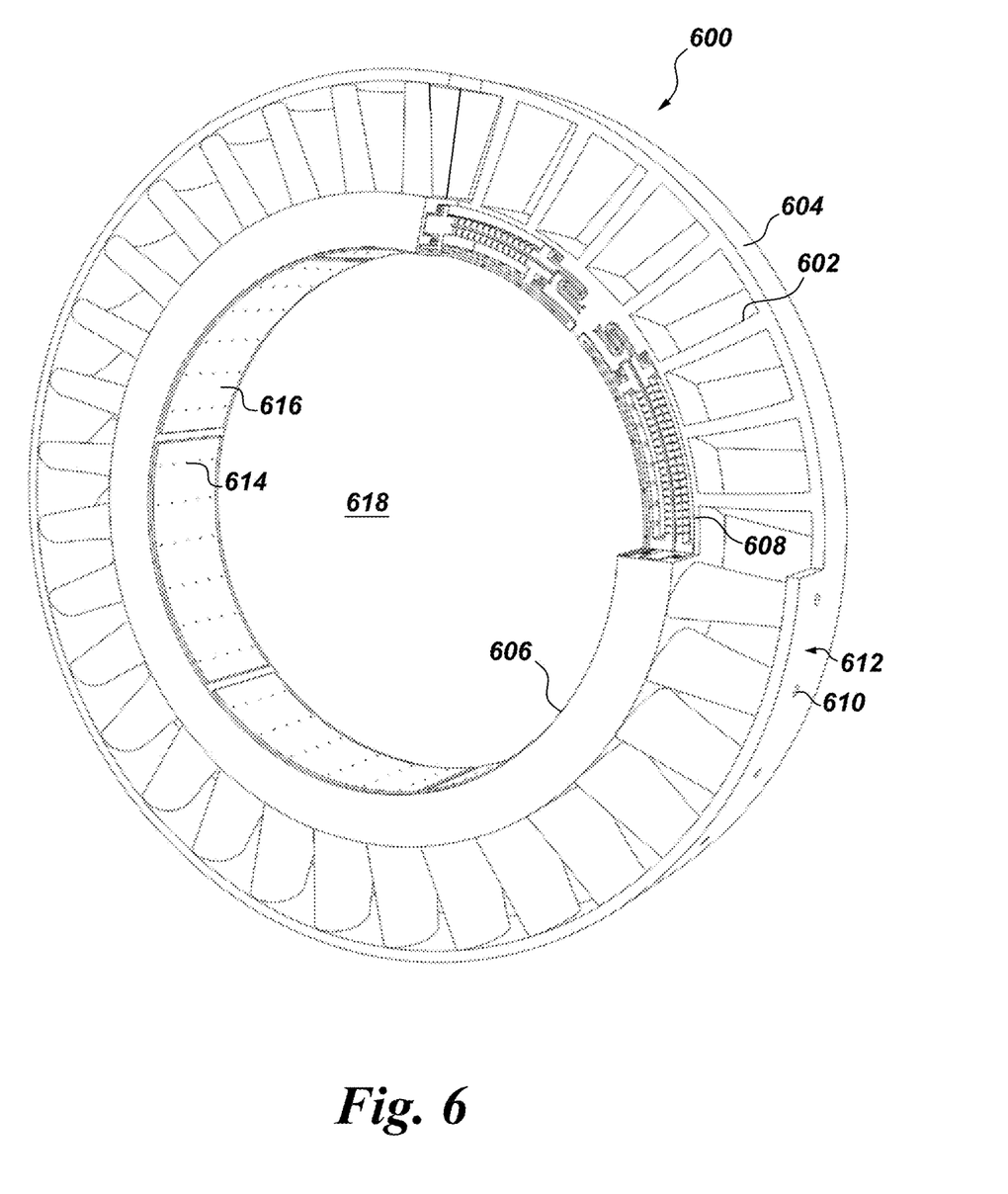
FIG. 6 is a partial cross-sectional view of an exemplary stator in accordance with some embodiments of the present invention.

The one or more bearings may be integrated into any component of the engine suitable to provide the aforementioned benefits. For example, in some embodiments, a bearing 606 may be integrated into a stage 600 of an aircraft engine, such as shown in FIG. 6. The stage 600 may be any rotary or stationary component of the engine, for example, such as a stator, inlet guide vane, nozzle, turbine nozzle, or the like. The stage 600 may be fabricated via any technique suitable to facilitate forming the integral part. For example, in some embodiments, at least a portion of the integrated stage 600/bearing 606 component may be fabricated using an electric discharge machining (EDM) process or additive manufacturing process (also known as rapid prototyping, rapid manufacturing, and 3D printing) such as selective laser sintering (SLS), direct metal laser sintering (DMLS), electron beam melting (EBM), diffusion bonding, or selective heat sintering (SHS).

In some embodiments, the stage 600 may generally comprise the bearing 606, a plurality of airfoils 602 and an outer ring 604. In some embodiments, the airfoils 602 may be disposed between a housing 608 (e.g., the housing 330 as described above) of the bearing 606 and the outer ring 604. In some embodiments, the airfoils 602 may be coupled to the housing 608 and/or outer ring 604. In embodiments where the airfoils 602 are coupled to only one of the housing 608 or outer ring 604, the outer ring 604 and bearing 606 may rotate independent of one another. In some embodiments, the outer ring 604 and housing 608 may disposed concentric or coaxial with one another, or alternatively, in some embodiments may be disposed eccentric or non-concentric with one another.

In some embodiments, the airfoils 602 are formed integrally with, at least one of the housing 608 and outer ring 604 (e.g., via the fabrication techniques described above). The airfoils 602 may be of any shape or size suitable to direct a flow of air in a desired manner and may be specific to the placement of the stage 600. The airfoils 602 may be any type of air foils suitable for a desired application or placement within the engine/turbomachine. For example, in some embodiments, the airfoils 602 may be inlet guide vanes. In such embodiments, the stage 600 may be utilized as a guide vane assembly for, for example, a compressor section of an engine. Alternatively, in some embodiments, the airfoils 602 may be nozzles. In such embodiments, the stage 600 may be utilized as a nozzle or nozzle ring for, for example, a turbine section of an engine. In some embodiments, the airfoils 602 may include stator airfoils, fixed or variable guide vanes/nozzles, combinations thereof, or the like.

Figure 7:
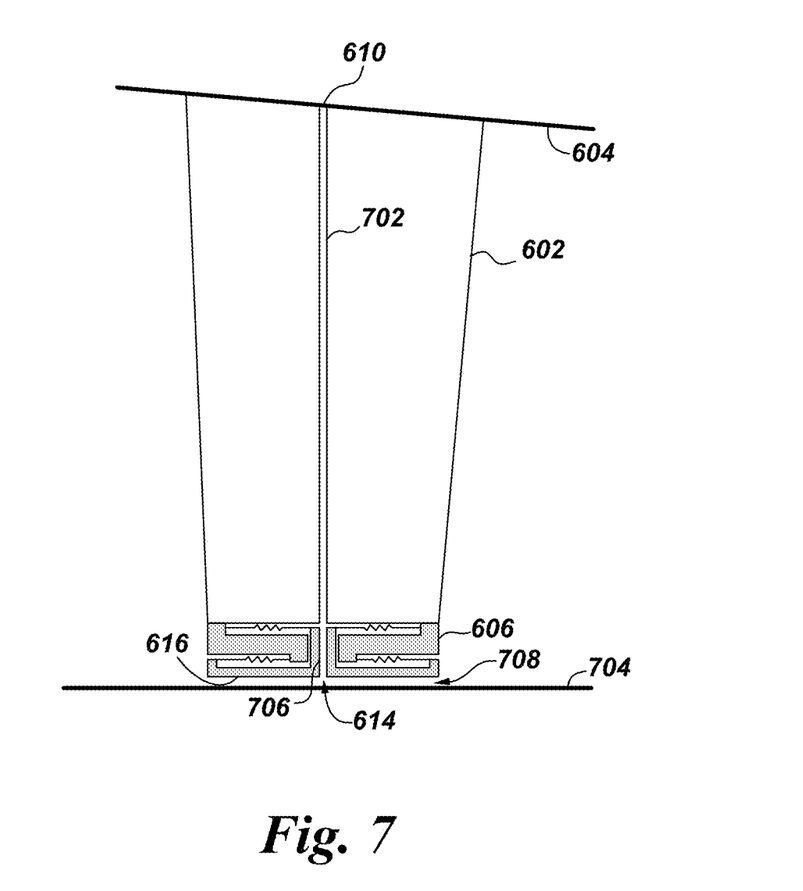
FIG. 7 is a partial cross-sectional view of a portion of an exemplary stator in accordance with some embodiments of the present invention.

In some embodiments, one or more gas inlet holes 610 may be formed in an outer surface 612 of the stage 600. When present, the gas inlet holes 610 may facilitate a flow of gas (e.g., air) through the plurality of airfoils 602 to the interior cavity 618 defined by the bearing 606 of the stage 600 via gas distribution holes 614 of the bearing pad 616 (e.g., such as similar to the gas distribution holes 308 and bearing pad 304 described above). For example, referring to FIG. 7, in some embodiments, the gas inlet holes 610 may be fluidly coupled to a through hole 702 formed in one or more of the airfoils 602. In such embodiments, the through hole 702 maybe aligned with, and/or fluidly coupled to, a gas inlet 706 of the bearing 606. The gas inlet 706 fluidly coupled to one or more gas distribution holes 614 directly, or in some embodiments, via a plenum (such as the plenum 310 described above with respect to FIG. 3). In operation, air may be directed to an area 708 between the bearing pad 616 and a surface 704 of a rotatable engine component (e.g., a surface of a shaft such as the core shaft 168 described above, a surface of a compressor stage, such as the compressor blade assembly 128 described above, or the like), thereby providing support and/or lubrication to the engine component. The air may be any type of air received from any source available to the engine. For example, in some embodiments at least a portion of air compressed by a compressor stage of the engine may be directed through the through hole 702 via the gas inlet 610.

The bearing 606 may be any bearing suitable for use in a desired engine or turbomachine, for example, such as the bearing 200 (e.g., gas bearing) in any of the embodiments described above. For example, referring to FIG. 8, in some embodiments, the bearing 606 may generally include a housing 816, damper plunger 810, bearing pad 812 and one or more compliant seals (two compliant seals 820 shown). As compared to other embodiments described above (e.g., such as shown in FIG. 3), the embodiment depicted in FIG. 8 integrates the compliant damper fluid springs (e.g., springs 332) with the pad spring system therefore further reducing complexity and size. When configured in such a manner, this integration may facilitate the compact and efficient application of this component to an existing guide vane or turbine nozzle stator.

Figure 8:
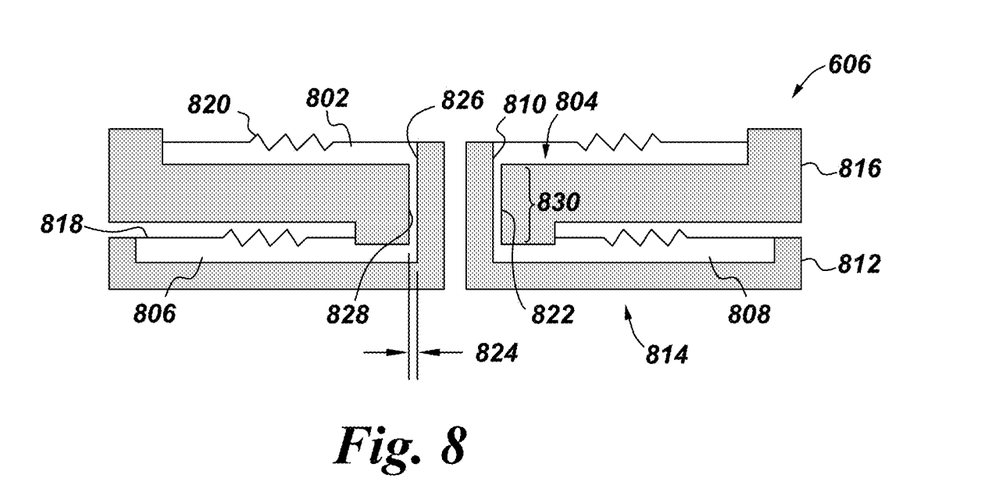
FIG. 8 is a partial cross-sectional view of an exemplary gas bearing suitable for use with a stage in accordance with some embodiments of the present invention.

The damper plunger 810 is disposed within a through and annular hole 822 formed in the housing 816 and separates a cavity 804 into a first control volume 802 and a second control volume 806. The damper plunger 810 and cavity 804 is dimensioned relative to one another to provide a predetermined clearance 824 between a surface 826 of the damper plunger 810 and the cavity wall 828 to form a resistive flow path 830 between the first control volume 802 and the second control volume 806. The unoccupied portion of the cavity 804 is filled with a non-compressible, viscous fluid 808 and is hermetically sealed via the compliant seals 820, 818. In operation, when a force (e.g., a vibrational force caused by rotation of a shaft) is applied to the bearing pad 814, a relative motion between the damper plunger 826 and the housing 816 occurs. Such a motion causes the fluid 808 to be forced through resistive flow path 830 between the first control volume 802 and the second control volume 806 of the cavity 804. Due to a dash-pot effect of the fluid 808 (resistance to motion via viscous friction) an energy of the force is dissipated, thereby damping the force.

While described above as separate components, at least two of the components (e.g., housing 816, damper plunger 810, bearing pad 812 and compliant seals 820) may be integrally formed with one another, thereby further reducing the cost, complexity, size and weight of the bearing 606. In some embodiments, the bearing 606 may be fabricated such that the entire bearing 606 is a single integral part. Any suitable fabrication technique may be utilized to create such integrally formed parts, for example such as the EDM or additive manufacturing techniques described above. The inventors have observed that fabricating the bearing 606 as a single part significantly reduces a weight and size of a conventionally assembled multicomponent bearing. Such a reduction in weight and size allows the bearing to be used in weight and space limited applications (e.g., aircraft engines) that would otherwise exclude the use of conventionally assembled multicomponent bearings.

As noted above, the use of non-oil requiring bearings (e.g., air bearings or bearings 200, 606 described above) eliminates the need for conventional oil support components (e.g., sumps, filters, or the like), thereby reducing parts, weight and complexity of the engine. Moreover, the requisite axial span typically needed to isolate oil requiring bearings from other components may also be eliminated due to the lubricating the gas bearing with the working fluid of the turbomachine, thereby allowing for a reduction of length and further reduction of weight of the engine. Such elimination of support components and elimination of the otherwise required axial span may provide an ability to engineer rotor bearing systems with additional stages and further allow the bearing to be utilized in various locations of the engine that would otherwise not be feasible in conventional engine/bearing design. In addition, the integration of the bearing into an engine component (e.g., stage 600 described above) provides further versatility with respect to placement of the bearing in various locations of the engine. For example, FIG. 9 (depicting an exemplary portion of the compressor stage 128, such as indicated at 166 in FIG. 1) depicts an exemplary placement of the stage 600 in accordance with some embodiments of the present invention. As shown in the figure, in some embodiments, the stage 600 having the bearing 606 integrated therewith may be disposed between compressor blades 132 of a compressor stage 128 of the engine. Although shown as one exemplary configuration in FIG. 9, the placement of the stage 600 is not limited to the compressor stage 128. For example, the stage 600 may be disposed between blades of a turbine blade assembly (e.g., turbine blade assembly 134 of the turbine section 112 described above), for example such as described below in FIG. 11.

The inventors have observed that such placement and utilization of the stage 600 may further benefit engine operation by reducing clearance closures during maneuver of loads, reducing dynamic bearing and structural loads, reducing synchronous vibration response, and improving stability.

Figure 10:
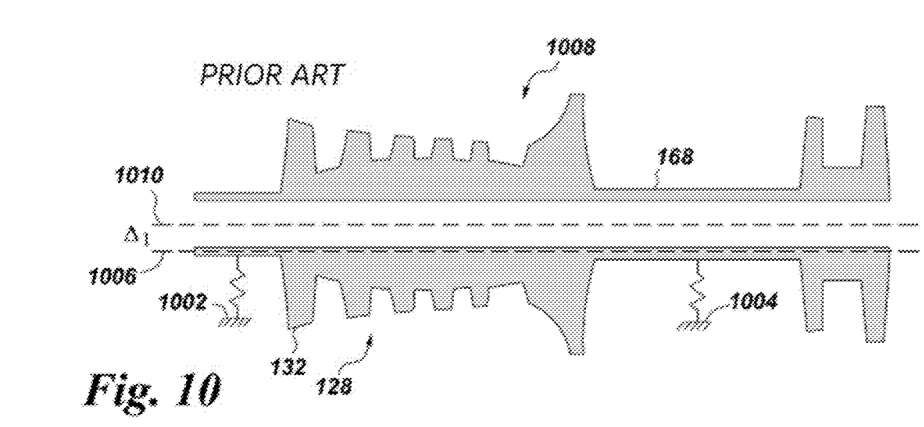
FIG. 10 is a schematic view of a rotary machine in accordance with some embodiments of the present invention.
Figure 11:
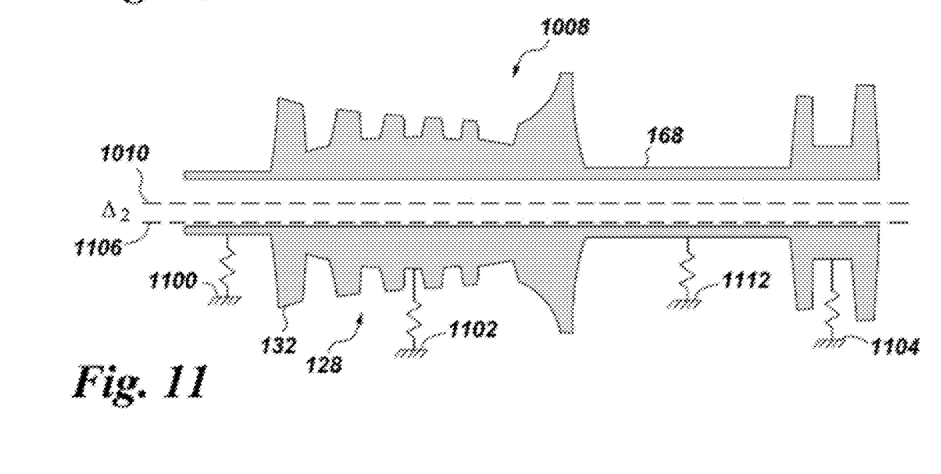
FIG. 11 is a schematic view of a rotary machine in accordance with some embodiments of the present invention.

For example, a relationship between a deflection of the shaft under the application of force and a stiffness of the bearing may be illustrated by the formula:

$$F=kX$$

wherein F is a force applied to the shaft, k is the stiffness of the bearing, and X is a deflection of the shaft. Referring to FIG. 10, in engine designs utilizing conventional bearings (e.g., such as the turbomachine 100 described above) the placement of the bearings is typically limited to positions proximate opposing ends of the compressor blade assembly 128. Thus, in such instances, when a force 1008 is applied to the shaft, the stiffness (shown at 1002 and 1004 for exemplary placement of the bearing) of each bearing allows for a deflection Δ1 of the shaft 168 (e.g., such as depicted by the change from a first position 1010 to second position 1006). However, the inventive stage 600 as described herein allows for the utilization of additional bearings and/or a replacement of conventionally utilized bearings (e.g., oil requiring bearings) without increasing dimensions or weight of the engine. As such, under the same force 1008, the aggregate increased stiffness 1110, 1102, 1112, 1104 and increased force distribution provided by the additional bearings may result in less deflection Δ2 of the shaft 168 (e.g., such as depicted by the change from a first position 1010 to second position 1106), for example such as shown in FIG. 11. Such a decrease in shaft deflection may reduce rotor stresses (e.g., bending), reduce clearance closures at compressor and turbine stages and reduce or eliminate instances of contact between rotors, thereby reducing or eliminating wear or damage and also significantly improving the specific fuel burn of the engine resulting in higher efficiency and power density.

Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A stage for a turbomachine, comprising:
   a bearing having a housing, the bearing defining an interior cavity, the bearing comprising:
   a fluid filled cavity disposed within the housing;
   a compliant seal disposed within an opening of the fluid filled cavity to seal the fluid filled cavity;
   a damper plunger disposed within the fluid filled cavity, wherein the damper plunger is movable within the fluid filled cavity;
   an outer rim;
   a plurality of bearing pad springs; and
   a bearing pad disposed outside of the fluid filled cavity and coupled to the damper plunger, wherein the bearing pad is coupled to the housing via the plurality of bearing pad springs, and wherein the damper plunger, the bearing pad springs, the housing, the outer rim and the bearing pad are fabricated as a single integrated part using at least one of an electric discharge machining process and an additive manufacturing process;
   an outer ring concentric with the housing, wherein the outer ring is disposed radially outward from the housing; and
   a plurality of airfoils disposed between the housing of the bearing and the outer ring, wherein the plurality of airfoils are disposed entirely radially outward from the housing.

2. The stage of claim 1, wherein the outer ring and plurality of airfoils are formed using at least one of an electric discharge machining process and an additive manufacturing process, and
   wherein the housing is disposed radially inward of each airfoil of the plurality of airfoils.

3. The stage of claim 1, further comprising:
   a gas inlet hole formed in an outer surface of the stage;
   a through hole formed in a guide vane of the plurality of airfoils; and
   a gas inlet formed in the bearing, wherein the gas inlet hole, the through hole, the gas inlet, and the interior cavity are fluidly coupled to one another.

4. The stage of claim 3, wherein the bearing pad has at least one gas distribution hole formed therein, wherein the at least one gas distribution hole fluidly couples the gas inlet to the interior cavity,
   wherein the at least one gas distribution hole comprises a diameter in a range between 2 mils and 100 mils.

5. The stage of claim 1, wherein the bearing is a non-oil requiring air bearing.

6. The stage of claim 1, wherein the damper plunger and the fluid filled cavity have relative dimensions such that an end of the damper plunger and a wall of the fluid filled cavity provide a resistive flow path of the fluid between a first control volume and a second control volume of the fluid filled cavity,
   wherein the bearing pad is symmetrically arranged about a central axis of the bearing and defines an annular inner surface that is configured to support a rotatable shaft.

7. The stage of claim 1, wherein the stage is an inlet guide vane or nozzle.

8. The stage of claim 1, wherein the plurality of airfoils are a plurality of inlet guide vanes or a plurality of nozzles.

9. A turbomachine, comprising:
   a rotor assembly coupling a compressor section and a turbine section, the rotor assembly comprising a rotor;
   a stage disposed about the rotor and rotationally supporting the rotor, the stage comprising:
   a bearing having a housing, the bearing defining an interior cavity, the bearing comprising:
   a fluid filled cavity disposed within the housing;

a compliant seal disposed within an opening of the fluid filled cavity to hermetically seal the fluid filled cavity;

a damper plunger disposed within the fluid filled cavity, wherein the damper plunger is movable within the fluid filled cavity; and a bearing pad disposed outside of the fluid filled cavity and coupled to the damper plunger, wherein the damper plunger and bearing pad are fabricated as a single integrated part using at least one of an electric discharge machining process and an additive manufacturing process;

an outer ring concentric with the housing, wherein the outer ring is disposed radially outward from the housing; and a plurality of airfoils disposed between the housing of the bearing and the outer ring, wherein the plurality of airfoils are disposed entirely radially outward from the housing.

10. The turbomachine of claim 9, wherein the outer ring and plurality of airfoils are formed using at least one of an electric discharge machining process and an additive manufacturing process.

11. The turbomachine of claim 9, further comprising:
a gas inlet hole formed in an outer surface of the stage; and
a through hole formed in a guide vane of the plurality of airfoils; and
a gas inlet formed in the bearing, wherein the gas inlet hole, the through hole, the gas inlet, and the interior cavity are fluidly coupled to one another.

12. The turbomachine of claim 11, wherein the bearing pad has at least one gas distribution hole formed therein, wherein the at least one gas distribution hole fluidly couples the gas inlet to the interior cavity,
wherein the at least one gas distribution hole is fluidly coupled to one or more plenums to facilitate even distribution of the gas,
the turbomachine further comprising at least one bearing pad sealing plate coupled to the bearing pad to seal the one or more plenums.

13. The turbomachine of claim 12, wherein the gas inlet hole is configured to receive compressed air from the compressor section, and
wherein the at least one gas distribution hole comprises a diameter in a range between 5 mils and 20 mils.

14. The turbomachine of claim 12, wherein the bearing is a non-oil requiring air bearing, the bearing further comprising:

one or more mechanical stops disposed proximate a back surface of the bearing pad to limit a range of motion of the bearing pad.

15. The turbomachine of claim 9, wherein the damper plunger and the fluid filled cavity have relative dimensions such that an end of the damper plunger and a wall of the fluid filled cavity provide a resistive flow path of the fluid between a first control volume and a second control volume of the fluid filled cavity.

16. The turbomachine of claim 9, wherein the housing; and the compliant seal are fabricated as a single integrated part using at least one of an electric discharge machining and additive manufacturing process,
wherein the bearing is at least partially composed of sintered material.

17. The turbomachine of claim 9, wherein the stage comprises at least one of an inlet guide vane or nozzle.

18. The turbomachine of claim 9, wherein the plurality of airfoils are a plurality of inlet guide vanes or a plurality of nozzles.

19. A compressor stage for a turbomachine, comprising:
a bearing having a housing, the bearing defining an interior cavity and disposed between two compressor blades of the compressor stage;
an outer ring concentric with the housing, wherein the outer ring is disposed radially outward from the housing; and
a plurality of airfoils disposed between the housing of the bearing and the outer ring, wherein the plurality of airfoils are disposed entirely radially outward from the housing.

20. A turbomachine, comprising:
a rotor assembly coupling a compressor section and a turbine section, the rotor assembly comprising a rotor;
a compressor stage disposed about the rotor and rotationally supporting the rotor, the compressor stage comprising:
a bearing having a housing, the bearing defining an interior cavity and disposed between two compressor blades of the compressor stage;
an outer ring concentric with the housing, wherein the outer ring is disposed radially outward from the housing; and
a plurality of airfoils disposed between the housing of the bearing and the outer ring, wherein the plurality of airfoils are disposed entirely radially outward from the housing.

* * * * *